(12) United States Patent
Lesea

(10) Patent No.: US 8,522,052 B1
(45) Date of Patent: Aug. 27, 2013

(54) METHOD AND INTEGRATED CIRCUIT FOR SECURE ENCRYPTION AND DECRYPTION

(75) Inventor: Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 457 days.

(21) Appl. No.: 12/755,927

(22) Filed: Apr. 7, 2010

(51) Int. Cl.
*H04L 9/00* (2006.01)

(52) U.S. Cl.
USPC ............................................. 713/194; 726/36

(58) Field of Classification Search
USPC ................................ 380/28–30, 46; 713/174
See application file for complete search history.

(56) References Cited

U.S. PATENT DOCUMENTS

| | | | | |
|---|---|---|---|---|
| 4,809,703 | A * | 3/1989 | Ishikawa et al. | 600/454 |
| 5,404,402 | A | 4/1995 | Sprunk | |
| 6,086,629 | A | 7/2000 | McGettigan et al. | |
| 6,144,230 | A | 11/2000 | Kim | |
| 6,205,421 | B1 * | 3/2001 | Morii | 704/226 |
| 6,327,661 | B1 | 12/2001 | Kocher et al. | |
| 6,356,555 | B1 * | 3/2002 | Rakib et al. | 370/441 |
| 6,970,561 | B1 | 11/2005 | Obana | |
| 7,031,370 | B1 * | 4/2006 | Fukumasa | 375/141 |
| 7,123,579 | B1 * | 10/2006 | Lyu | 370/203 |
| 7,215,656 | B1 * | 5/2007 | Kim et al. | 370/336 |
| 7,389,316 | B1 | 6/2008 | Baetoniu | |
| 7,500,110 | B2 * | 3/2009 | Peeters et al. | 713/193 |
| 7,853,012 | B2 * | 12/2010 | Sarangarajan et al. | 380/28 |
| 2001/0024956 | A1 * | 9/2001 | You et al. | 455/455 |
| 2003/0053625 | A1 | 3/2003 | Bially et al. | |
| 2003/0084336 | A1 * | 5/2003 | Anderson et al. | 713/200 |
| 2003/0154226 | A1 * | 8/2003 | Khmelnik | 708/490 |
| 2003/0182649 | A1 | 9/2003 | Harn | |
| 2005/0111524 | A1 * | 5/2005 | Baker et al. | 375/147 |
| 2005/0271202 | A1 | 12/2005 | Shu et al. | |
| 2007/0213062 | A1 * | 9/2007 | Medlock et al. | 455/436 |
| 2008/0098233 | A1 * | 4/2008 | Dewkett et al. | 713/189 |
| 2008/0123446 | A1 | 5/2008 | Pickles | |
| 2008/0181319 | A1 * | 7/2008 | Kao et al. | 375/260 |
| 2008/0231240 | A1 * | 9/2008 | Parkes et al. | 322/28 |
| 2008/0259683 | A1 * | 10/2008 | Lisi et al. | 365/185.2 |
| 2009/0039919 | A1 | 2/2009 | Verbauwhede et al. | |
| 2009/0248771 | A1 | 10/2009 | Vergnes et al. | |
| 2009/0279687 | A1 | 11/2009 | Yoshimoto et al. | |
| 2009/0307516 | A1 | 12/2009 | Renaudin et al. | |
| 2010/0002751 | A1 * | 1/2010 | Dent | 375/141 |
| 2010/0054759 | A1 * | 3/2010 | Oda et al. | 398/202 |
| 2010/0067685 | A1 | 3/2010 | Okita | |

(Continued)

OTHER PUBLICATIONS

Bucci, Marco et al., "A Countermeasure Against Differential Power Analysis Based on Random Delay Insertion," *Proc. of the IEEE International Symposium on Circuits and Systems*, May 23, 2005, pp. 3547-3550, IEEE, Piscataway, New Jersey, USA.

(Continued)

*Primary Examiner* — Gilberto Barron, Jr.
*Assistant Examiner* — Abdulhakim Nobahar
(74) *Attorney, Agent, or Firm* — LeRoy D. Maunu

(57) ABSTRACT

In one embodiment of the present invention a secure cryptographic device is provided. The device includes a power supply interface, a cryptographic processing block coupled to the power supply interface, a random number generator, and a complex multiplication circuit. The complex multiplication circuit has an output coupled to the power supply interface for modulating a power variation waveform detectable on the power supply interface. The complex multiplication circuit also has a first input coupled to an output of the random number generator and a second input coupled to the power supply interface.

12 Claims, 6 Drawing Sheets

(56) References Cited

U.S. PATENT DOCUMENTS

| | | | |
|---|---|---|---|
| 2010/0119003 A1* | 5/2010 | Terabe et al. | 375/267 |
| 2010/0150340 A1 | 6/2010 | Choi et al. | |
| 2011/0096925 A1 | 4/2011 | Zhu et al. | |
| 2011/0167279 A1 | 7/2011 | Danger et al. | |
| 2011/0228255 A1* | 9/2011 | Li et al. | 356/33 |
| 2011/0285420 A1 | 11/2011 | Deas et al. | |
| 2012/0072737 A1 | 3/2012 | Schrijen et al. | |

OTHER PUBLICATIONS

Golic, Jovan DJ., "New Methods for Digital Generation and Postprocessing of Random Data," *IEEE Transactions on Computers*, Oct. 1, 2006, vol. 55, No. 10, pp. 1217-1229, IEEE, Los Alamitos, California, USA.

Lu, Yingxi et al., "FPGA Implementation and Analysis of Random Delay Insertion Countermeasure Against DPA," *Proc. of the 2008 International Conference on Field-Programmable Technology*, Dec. 8, 2008, pp. 201-208, IEEE, Piscataway, New Jersey, USA.

Schellekens, Dries et al., "FPGA Vendor Agnostic True Random Number Generator," *Proc. of the 2006 International Conference on Field Programmable Logic and Applications*, Aug. 1, 2006, pp. 1-6, IEEE, Piscataway, New Jersey, USA.

Moore, Simon et al., "Improving Smart Card Security using Self-timed Circuits," *Proc. of the 8th International Symposium on Asynchronous Circuits and Systems*, Apr. 8, 2002, pp. 211-218, IEEE, Piscataway, NJ, USA.

Hauck, Scott et al., "Logic Elements," *Reconfigurable Computing: The Theory and Practice of FPGA-Based Computation*, Nov. 2, 2007, pp. 4-5, Morgan Kaufman Publishers, Burlington, Massachusetts, USA.

Johnson, Howard et al., "Elmore Delay Estimation (RC Region)," *High-Speed Signal Propagation: Advanced Black Magic*, Feb. 24, 2003, pp. 141-142, Prentice Hall, Upper Saddle River, New Jersey, USA.

Wolf, Wayne, "Path Delay," *Modern VLSI Design: IP-Based Design*, 4$^{th}$ Edition, Dec. 21, 2008, pp. 222-223, Prentice Hall, Upper Saddle River, New Jersey, USA.

U.S. Appl. No. 12/755,792, filed Apr. 7, 2010, Lesea et al.

\* cited by examiner

METHOD AND INTEGRATED CIRCUIT FOR SECURE ENCRYPTION AND DECRYPTION

FIELD OF THE INVENTION

The present invention generally relates to encryption, and more particularly to the encryption of data used to reconfigure programmable logic.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that is programmable to implement a logic function. The function blocks of CPLDs, CLBs of FPGAs and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key to the structure that decrypts the design, and the key must be protected from unauthorized discovery A decryption key can be stored in nonvolatile memory of a programmable integrated circuit. An encrypted bitstream can then be loaded into the IC and decrypted using the key within the programmable logic. A configuration controller circuit is included in the IC to decrypt each frame of the encrypted bitstream and program configuration memory of the IC using the decrypted frames. In this manner, an attacker is prevented from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is decrypting. During normal operation, the amount of power used by a device varies depending on the logic gates activated at a given time. By monitoring variations in the power consumption while the device is decrypting a configuration bitstream, for example, the attacker can identify operations that are performed and determine the decryption key.

The present invention may address one or more of the above issues.

SUMMARY

In one embodiment of the present invention a secure cryptographic device is provided. The device includes a power supply interface, a cryptographic processing block coupled to the power supply interface, a random number generator, and a complex multiplication circuit. The complex multiplication circuit has an output coupled to the power supply interface for modulating a power variation waveform detectable on the power supply interface. The complex multiplication circuit also has a first input coupled to an output of the random number generator and a second input coupled to the power supply interface.

In another embodiment, the complex multiplication circuit multiplies real and imaginary components of the power variation waveform with a random output from the random number generator.

In another embodiment, a digital-to-analog converter is coupled to the output of the random number generator. A complex waveform generator is coupled to an output of the digital-to-analog converter. The first input of the complex multiplication circuit is coupled to the output of the random number generator via the analog-to digital converter and complex waveform generator.

In another embodiment, the complex waveform generator multiplies the output of the digital-to-analog converter with a sine wave to generate an imaginary waveform component and multiplies the output of the digital-to-analog converter with a cosine wave to generate a real waveform component. The complex waveform generator adds the imaginary and real waveform components to generate a complex waveform.

In another embodiment, the random number generator includes a ring oscillator and a linear feedback shift register circuit coupled to an output of the ring oscillator.

In another embodiment, the ring oscillator is configured to oscillate at a first frequency and the linear feedback shift register is driven by a clock having a second frequency.

In another embodiment, a secure cryptographic device includes an antenna coupled to the output of the complex multiplication circuit.

In another embodiment, a secure cryptographic device includes a modulation circuit coupled to the power supply interface. The output of the complex multiplication circuit is coupled to the power supply interface though the modulation circuit.

In another embodiment, the modulation circuit includes a transistor having a source and a drain selectably coupling the power supply interface to a ground voltage, the transistor having a gate coupled to the output of the complex multiplication circuit.

In another embodiment, a method is provided for resisting power analysis during configuration of a programmable integrated circuit (IC). An encrypted bitstream is input to the programmable IC and decrypted. Configuration memory of the programmable IC is programmed with the decrypted bitstream. Concurrently with the decrypting of the encrypted bitstream a complex waveform is generated, a power consumption waveform is detected, the power consumption waveform is complex multiplied with the complex waveform to produce a modulation waveform, and the power consumption waveform is modulated with the modulation waveform.

In another embodiment, the generation of the complex waveform includes generating a pseudo-random number sequence and generating a complex waveform from the pseudo-random number sequence.

In another embodiment, the generation of the complex waveform from the pseudo-random number sequence includes generating first and second analog signals from the pseudo-random number sequence. The first analog signal is multiplied with a cosine waveform to generate a real waveform component. The second analog signal is multiplied with a sine waveform to generate an imaginary waveform component. The real and imaginary waveform components are added to generate the complex waveform.

In another embodiment, the modulated power consumption waveform is transmitted on a signal line to produce externally detectable electromagnetic radiation.

In another embodiment, the modulation of the power consumption waveform with the modulation waveform includes transmitting the modulation waveform on a power signal line in which the power consumption waveform is detected.

In another embodiment, the modulation of the power consumption waveform with the modulation waveform includes driving one or more active components with the power consumption waveform.

In another embodiment, the one or more active components are MOSFET transistors selectably coupling a power signal line to ground.

In another embodiment, a programmable integrated circuit (IC) is provided. The programmable integrated circuit includes a configuration memory, programmable logic resources coupled to the configuration memory, and programmable interconnection resources coupled to the configuration memory and programmable logic resources. A configuration controller is coupled to the configuration memory. The configuration controller configured to decrypt input configuration data using values from a portion of the configuration memory as a decryption key and program the configuration memory with the decrypted input configuration data. A power supply interface is coupled to the configuration controller. The programmable IC also includes a pseudo-random complex waveform generator. A complex multiplication circuit having a first input is coupled to an output of the pseudo-random complex waveform generator. A second input of the complex multiplication circuit is coupled to the power supply interface. An output of the complex multiplication circuit is coupled to the power supply interface for modulating a power variation waveform detectable on the power supply interface.

In another embodiment, the complex multiplication circuit multiplies real and imaginary components of the power variation waveform with an output from the pseudo-random complex waveform generator.

In another embodiment the complex waveform generator includes a pseudo-random number generator, a digital-to-analog converter coupled to the output of the pseudo-random number generator, and two multiplier circuits each coupled to an output of the digital-to-analog converter. The two multiplier circuits are configured to respectively multiply the output of the digital-to-analog converter with a sine wave to generate an imaginary waveform component and multiply the output of the digital-to-analog converter with a cosine wave to generate a real waveform component.

In another embodiment, the programmable IC includes an antenna coupled to the output of the complex multiplication circuit.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
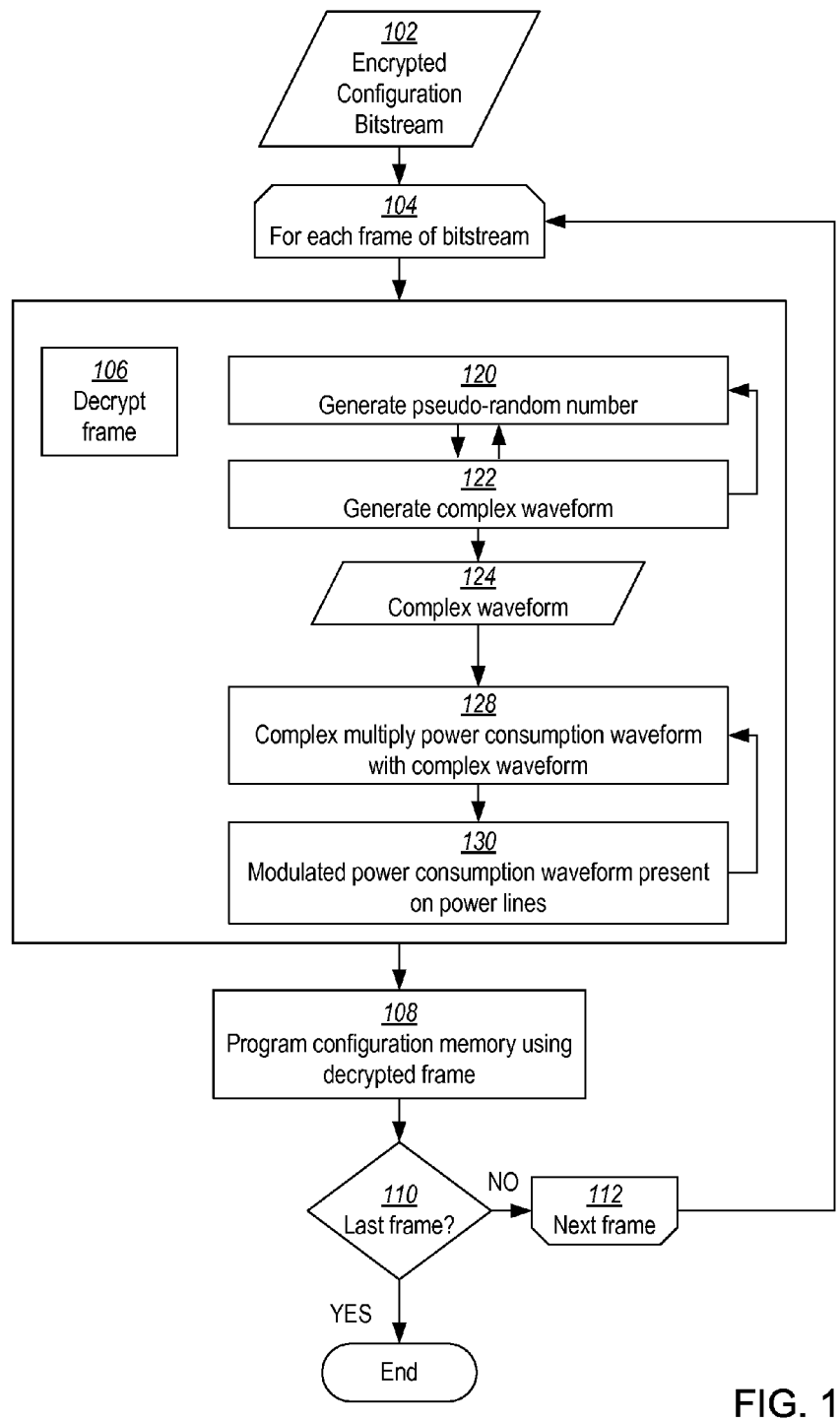
FIG. 1 shows a flowchart of an example process for configuration of programmable logic in accordance with several embodiments of the present invention.

During configuration of programmable logic, the configuration bitstream data can be intercepted and used to make unauthorized copies of the design. Although the configuration bitstream can be encrypted, the decryption key is vulnerable to discovery through power analysis. In a power analysis attack, current used by a device is monitored over time. During normal operation, the amount of power used by a device varies depending on the logic gates activated at a given time. By monitoring variations in the power consumption, the attacker can identify operations that are performed and determine the decryption key. The present invention provides countermeasures that may be implemented with software or hardware to improve resistance to power analysis attacks.

In a simple power analysis (SPA) attack, current used by a device is monitored over time. During normal operation, the amount of power used by a device varies depending on the logic gates activated at a given time. By monitoring variations in the power consumption, the attacker can identify different operations that are performed. For example, if a programmable IC implements DES encryption, sixteen rounds of encryption/decryption are performed on each block of data. Because similar operations are performed for each round, a power consumption data can be identified for each round. Comparison of power consumption of different rounds can identify key-dependent operations and, ultimately, the key used for decryption. For example, the DES key schedule is produced by rotating 28-bit key registers. The rotations are generally implemented using a right shift operation where a zero is shifted into the most significant bit by default. If the bit of the key shifted out of the register is a one, an additional operation is needed to cause the most significant bit to be equal to one. Therefore, a different power signature will be produced for each rotation depending on the bit of the decryption key. As used herein, a power signature may be referred to as power fluctuations, a power consumption signature, or a power consumption waveform, and such terms are used interchangeably herein. Other encryption ciphers, including both symmetric and asymmetric ciphers, also include key dependent operations that are susceptible to power analysis. One skilled in the art will recognize that the present invention is applicable to a number of synchronous and asynchronous encryption algorithms such as DES, DES-3, Blowfish, RSA, DSA, etc.

Random noise may be generated and added to modulate a power consumption waveform and conceal key dependent processes. However, even when the magnitude of the variations in power consumption are small in comparison to other power signals or noise, power variations of each operation can be detected and isolated using frequency filters and statistical analysis. This is known as differential power analysis (DPA). In DPA, a large number of samples are gathered by repeating encryption over a number of cycles. Samples gathered from each cycle are compared and analyzed to identify a common power signature among the repeated cycles from which the decryption can be identified. For example, added noise can be canceled and discarded through statistical averaging. When random noise is evenly distributed, the noise will have little effect on the average of power consumption data from repeated rounds of decryption.

In one method of attack, the power consumption is measured at external power supply ports. Some devices may include smoothing or buffer circuitry to prevent power consumption data from leaking to external ports. However, current flowing internally through signal lines generates radio frequency (RF) signals that are detectable external to the device. The embodiments of the present invention modulate a power consumption waveform through multiplication to increase the complexity of statistical analysis. The embodiments of the present invention may be used alone or in combination with other DPA mitigation techniques such as random noise generation, signal to noise reduction, or clock decorrelation.

In one embodiment of the present invention, a random number is generated and is complex multiplied with the power consumption waveform. Through complex multiplication, real and imaginary components of the power consumption waveform are modulated. Modulation of the complex components increases the complexity of statistical analysis, making the circuit more resilient to DPA. For example, if data samples from two repeated rounds of decryption are modulated to be of different phases, averaging alone cannot be used to reveal a common power consumption signature. Rather, more advanced algorithms would be needed by an attacker to identify similarities in the distribution of amplitude and phase for the rounds of repeated decryption.

FIG. 1 shows a flowchart of an example process for configuration of programmable logic in accordance with one or more embodiments of the present invention. An encrypted configuration bitstream 102 is received by a programmable IC. Each frame of the encrypted configuration bitstream 104 is decrypted at step 106. Configuration memory of the programmable logic IC is programmed with the decrypted frame at step 108. The process is repeated at decision step 110 until all remaining frames 112 have been decrypted. Concurrently with the decryption performed at step 106, a pseudo-random number is generated at step 120. A complex waveform 124 is generated from the pseudo-random number at step 122. The complex waveform is complex multiplied with the power consumption waveform at step 128. The resulting waveform is used to modulate the power consumption waveform present on power lines of the IC at step 130. Generation of the complex waveform 124 through steps 120 and 122 and modulation through steps 128 and 130 are repeated until each frame has finished decrypting.

Figure 2:
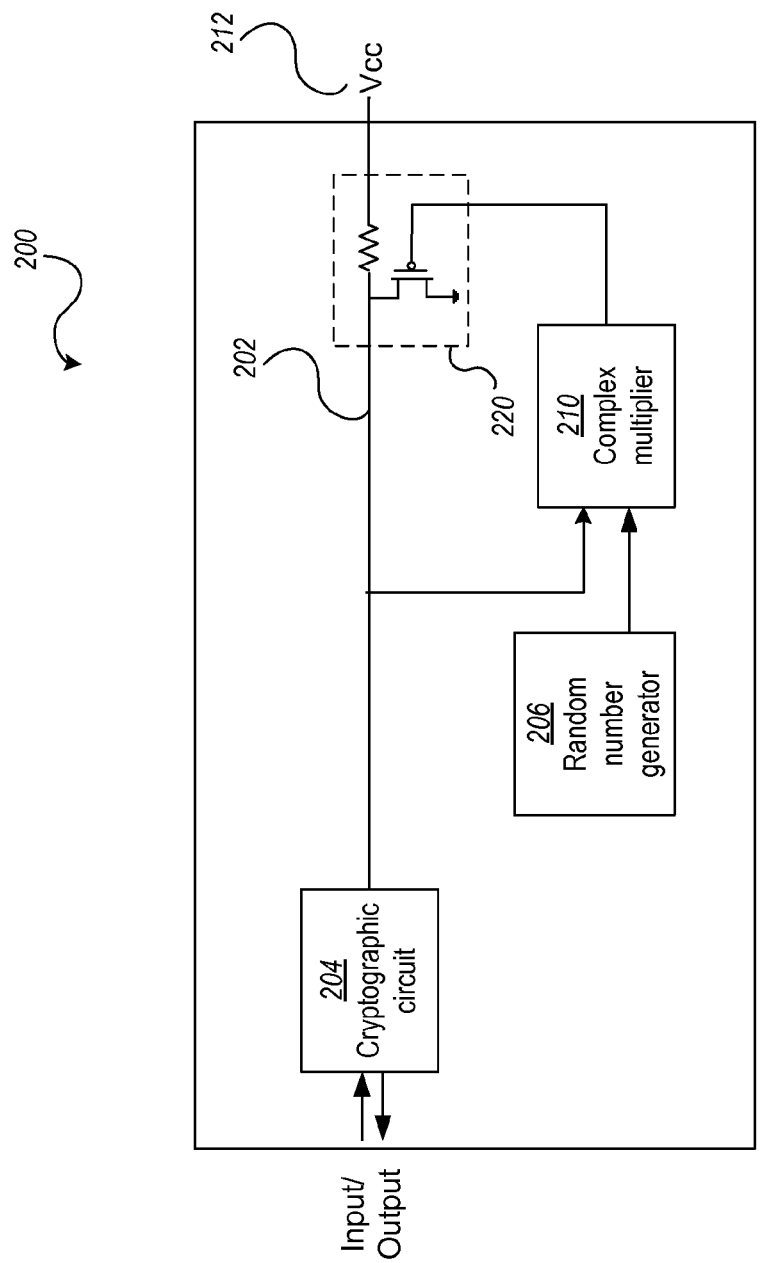
FIG. 2 shows a block diagram of a circuit for encryption/decryption configured according to several embodiments of the invention.

While DPA of complex modulated waveforms is difficult, the power consumption waveform can be complex modulated easily with little additional hardware or processing. In one embodiment, a circuit is provided for DPA resistant encryption and decryption. FIG. 2 shows a block diagram of a circuit for encryption/decryption configured according to one or more embodiments of the invention. Circuit 200 includes a cryptographic circuit 204 for encryption/decryption of data. Power line 202 couples the cryptographic circuit 204 to an external power source 212. During operation, cryptographic operations performed by the cryptographic circuit 204 cause power fluctuations to be present on power line 202. The power fluctuations are the power consumption waveform. The circuit includes a random number generator 206 and a complex multiplier 210. The complex multiplier 210 multiplies the power consumption waveform on power line 202 by a pseudo-random number generated by generator 206. The output of complex multiplier drives modulation circuit 220, which modulates the power consumption waveform of power line 202. In this example, the modulation circuit includes MOSFET coupled between power line 202 and ground. A resistance is connected between the MOSFET and the external power source 212. One skilled in the art will recognize that other active elements may be coupled to the power line 202 and driven by the output of the complex multiplier 210 to modulate the power consumption signature.

Figure 3:
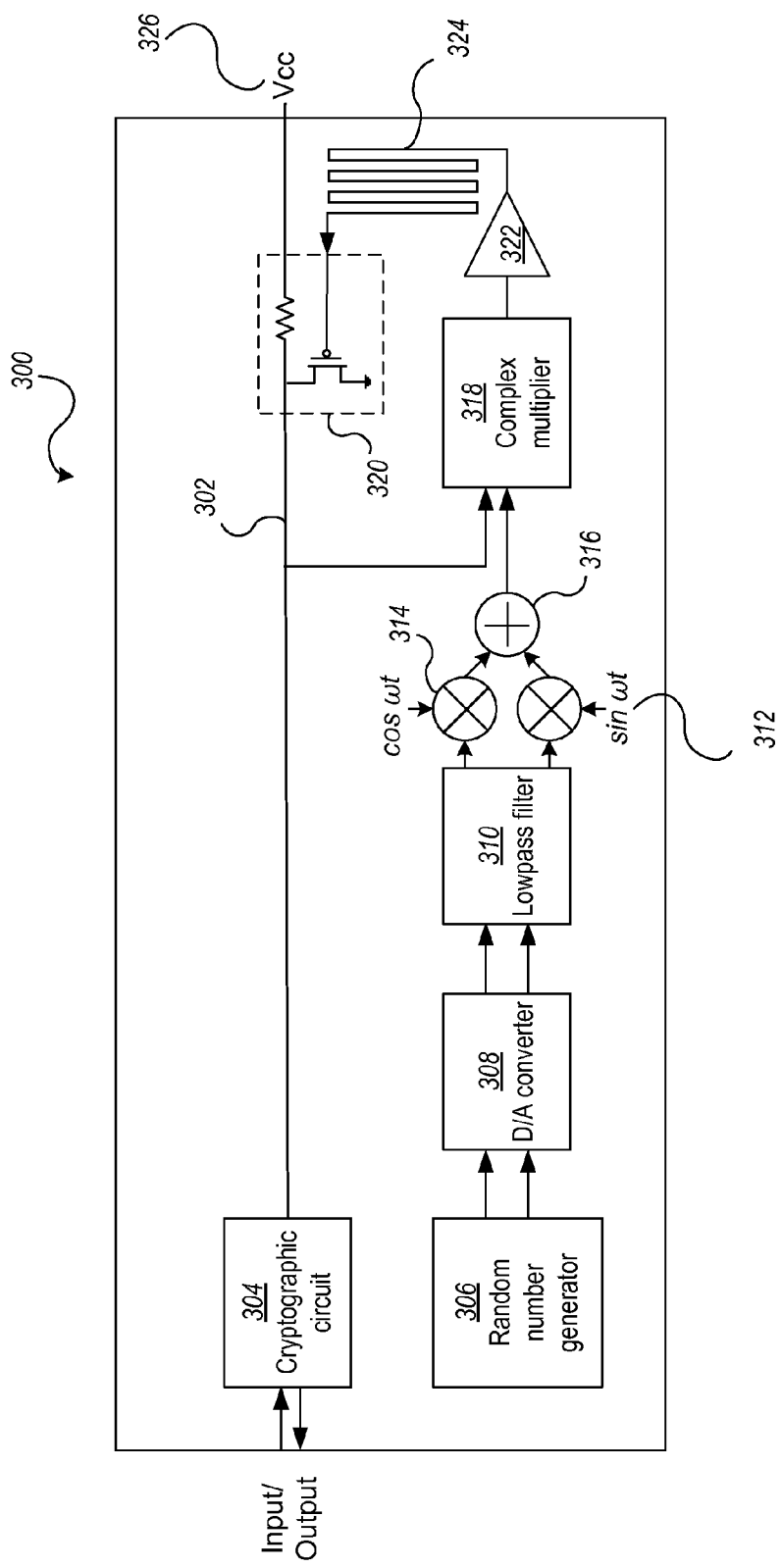
FIG. 3 shows a block diagram of an example circuit for encryption/decryption configured according to several embodiments of the invention.

The random number generator may be either an analog or a digital random number generator. If a digital random number generator is used, the random number output is converted to an analog complex waveform. FIG. 3 shows a block diagram of an example circuit for encryption/decryption configured according to one or more embodiments of the invention. In this example circuit, a digital random number generator 306 is used to generate pseudo-random numbers. Circuit 300 includes a cryptographic circuit 304 for encryption/decryption of data. Power line 302 couples the cryptographic circuit 304 to an external power source 326. During operation of the circuit, cryptographic operations performed by the cryptographic circuit 304 cause power fluctuations to be present on power line 302. The power fluctuations are the power consumption waveform. The circuit includes a digital random number generator 306. The output of the random number generator is converted to two analog signals by digital-to-analog (D/A) converter 308. The analog signals may be filtered by a low-pass filter 310 as shown to remove high frequency components. One of the random analog signals is multiplied with a cosine wave by multiplier 314 to generate a real waveform component. The second random analog signal is multiplied with a sine wave by multiplier 312 to generate an imaginary waveform component. The two waveform components are summed by adder 316 to generate a complex waveform. The complex waveform is multiplied with the power consumption waveform present on power line 302 by complex multiplier 318. The output of the complex multiplier can be used to modulate the power consumption waveform via modulation circuit 320. In this example, the modulation circuit and complex multiplier are coupled by a long signal line 324. The long signal line acts as an antenna to generate radio frequency (RF) signals from the complex waveform. In this example, an operational amplifier 322 is used to drive the output signal.

Figure 4:
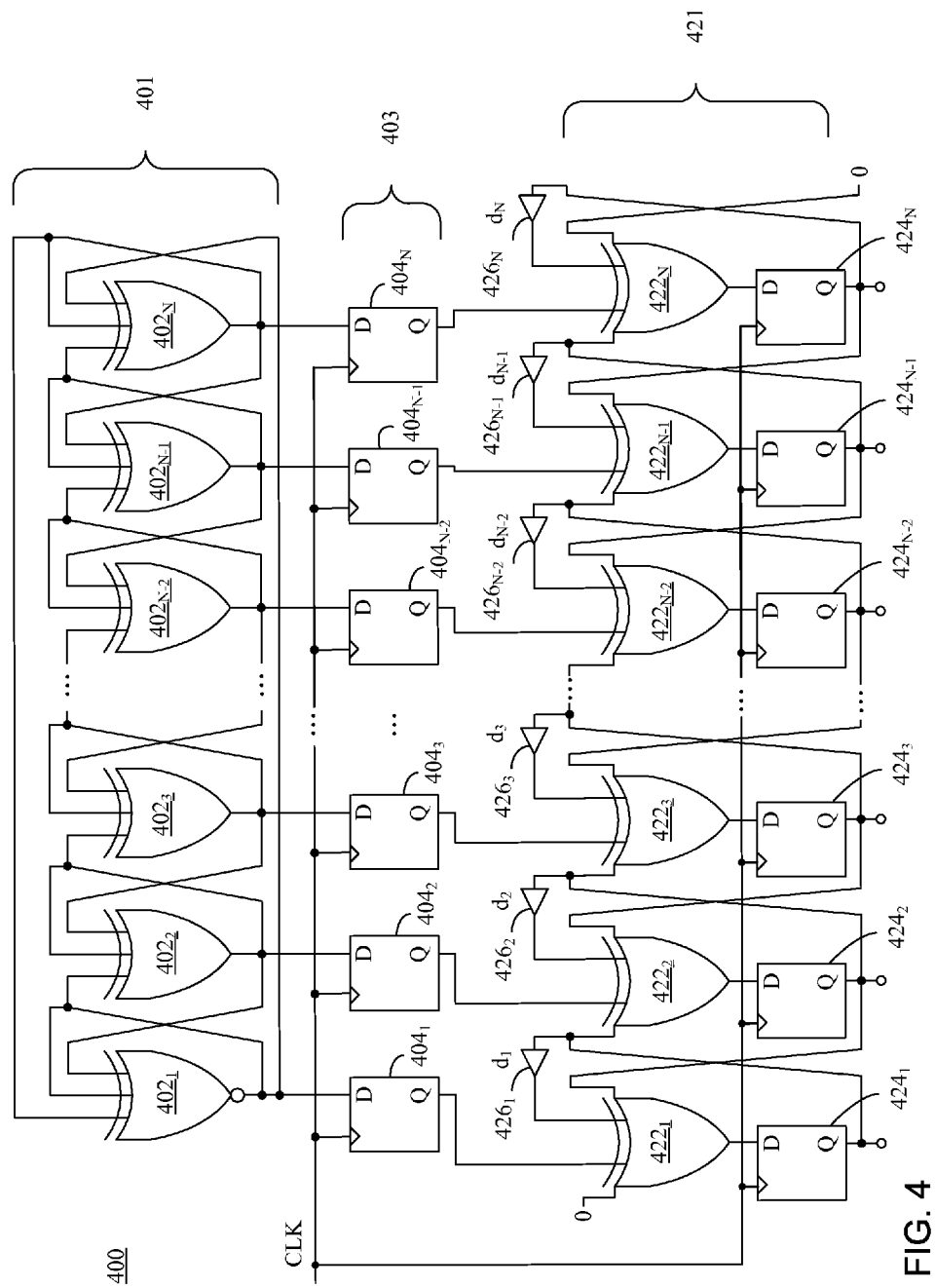
FIG. 4 shows a block diagram of an example random number generator that may be used to implement encryption and decryption circuits in accordance with several embodiments of the invention.

FIG. 4 shows a block diagram of an example random number generator that may be used to implement encryption and decryption circuits in accordance with one or more embodiments of the invention. The random number generator 400 includes a ring oscillator circuit 401, a sampling circuit 403, and a linear feedback shift register (LFSR) circuit 421. The ring oscillator circuit 401 consists of XOR gates $402_1$ through $402_N$ (collectively referred to as XOR gates 402). The XOR gates 402 are interconnected to form a "generalized N-bit ring oscillator" which operates at a first frequency dictated by the operating delay of the implementing circuit. Each one of the XOR-based ring oscillators is connected with its two neighbors (the boundary gates are considered neighbors) thereby creating a ring of ring oscillators. The ring oscillator circuit 401 is coupled to the sampling circuit 403. The output data terminals of the sampling circuit 403 are coupled to input data terminals of the LFSR 421. The LFSR 421 operates synchronously using a clock signal coupled to the sampling circuit 403. The clock signal operates at a different frequency than the ring oscillator. The LFSR 421 scrambles the output of the sampling circuit 403 to produce high-quality random numbers. The LFSR 421 comprises a set of XOR gates $422_1$ through $422_N$ (collectively referred to as XOR gates 422) and a set of storage cells $424_1$ through $424_N$. In one embodiment, each of the storage cells comprises a D-type flip-flop (collectively referred to as flip-flops 424). The XOR gates 422 and the flip-flops 424 implement an N-cell LFSR. Because the LFSR 421 operates at a different frequency than the ring oscillator 401, truly random N-bit binary numbers have a uniform probability distribution using only digital logic. The operation of this and other random number generators is described in detail in U.S. Pat. No. 7,389,316, which is incorporated by reference herein. Those skilled in the art will recognize that other random or pseudo-random number generators, implemented in hardware or in software, may be used to generate random numbers in accordance with the several embodiments of the invention.

Figure 5:
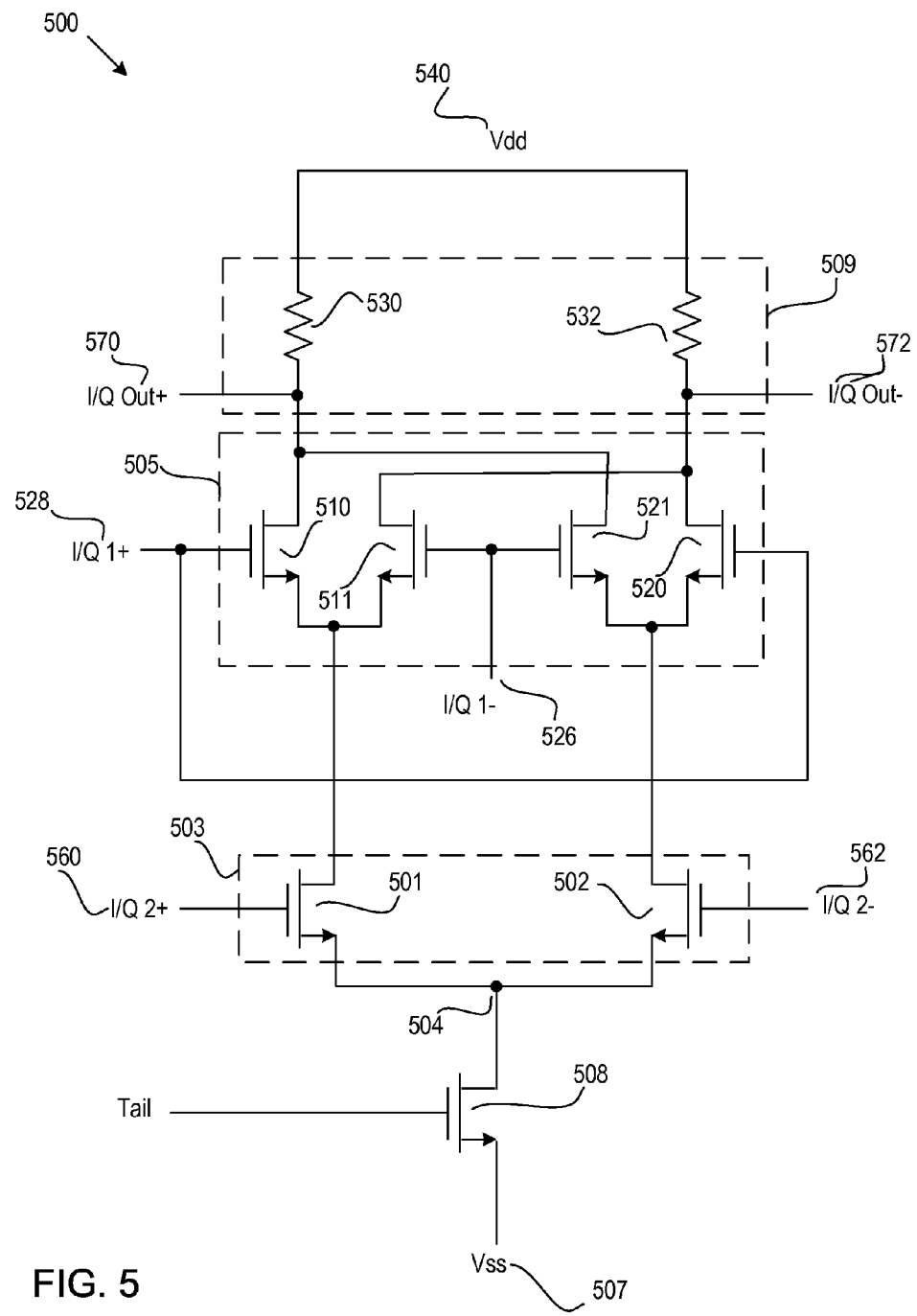
FIG. 5 illustrates a circuit diagram of an analog multiplier that may be used in accordance with several embodiments of the invention.

FIG. 5 illustrates an analog multiplier that may be used in accordance with several embodiments of the invention. The analog multiplier shown 500 is otherwise known as a Gilbert cell. The analog multiplier includes an RF input transconductor amplifier 503, core switching devices 505 and differential load 509. The analog multiplier includes four transistors 510, 511, 520, 521, known as an upper quad core of transistors 505. The upper quad core of transistors 505 are differentially connected in a common source configuration. The upper quad core transistors 505 are in turn connected to a lower quad core of driver transistors 501, 502. As shown in FIG. 5, the analog mixer 500 has two input ports I/O 1+528, I/Q 1−526 for receiving a first differential signal and two input ports I/O 2+560, I/Q 2−562 for receiving a second differential signal to be multiplied with the first signal. The multiplied signal is output at output ports 570 and 572. To multiply complex signals one analog multiplier can be used to multiply the real component of the power signature with the real component of the generated pseudo random waveform. A second analog multiplier can be used to multiply the complex component of the power signature with the real component of the generated pseudo-random waveform. The real and imaginary outputs of the first and second analog multipliers can be summed or used individually to modulate the power signature present on the power line of the circuit.

A first pair of NMOS transistors 501, 502 has a common source terminal 504 that is connected to the drain of transistor 508. The source of transistor 508 is connected to the negative supply rail 507. The gate of transistor 508 controls the tail current through transistor 508. The drain of the first NMOS transistor 501 is connected to the common sources of a second NMOS pair 510, 511 and the drain of the second NMOS transistor 502 is connected to the common sources of a third NMOS pair 520, 521. The gates of the transistors 511 and 521 are connected together 526. The drain of transistor 510 is connected to the drain of transistor 521 at a node 522. The drains of the transistors 511 and 520 are connected together at a second node 523. The first node 522 is connected to a first output resistor 530, which is connected to the supply rail 540. The second node 523 is connected to a second output resistor 532, which is connected to the positive supply rail via 540.

The analog multiplier shown in FIG. 5, provides near linear multiply functionality. Although non-linear multipliers may be used, highly linear modulation of the power signature provides the benefit of making the original power signature harder to observe through power analysis attacks.

Figure 6:
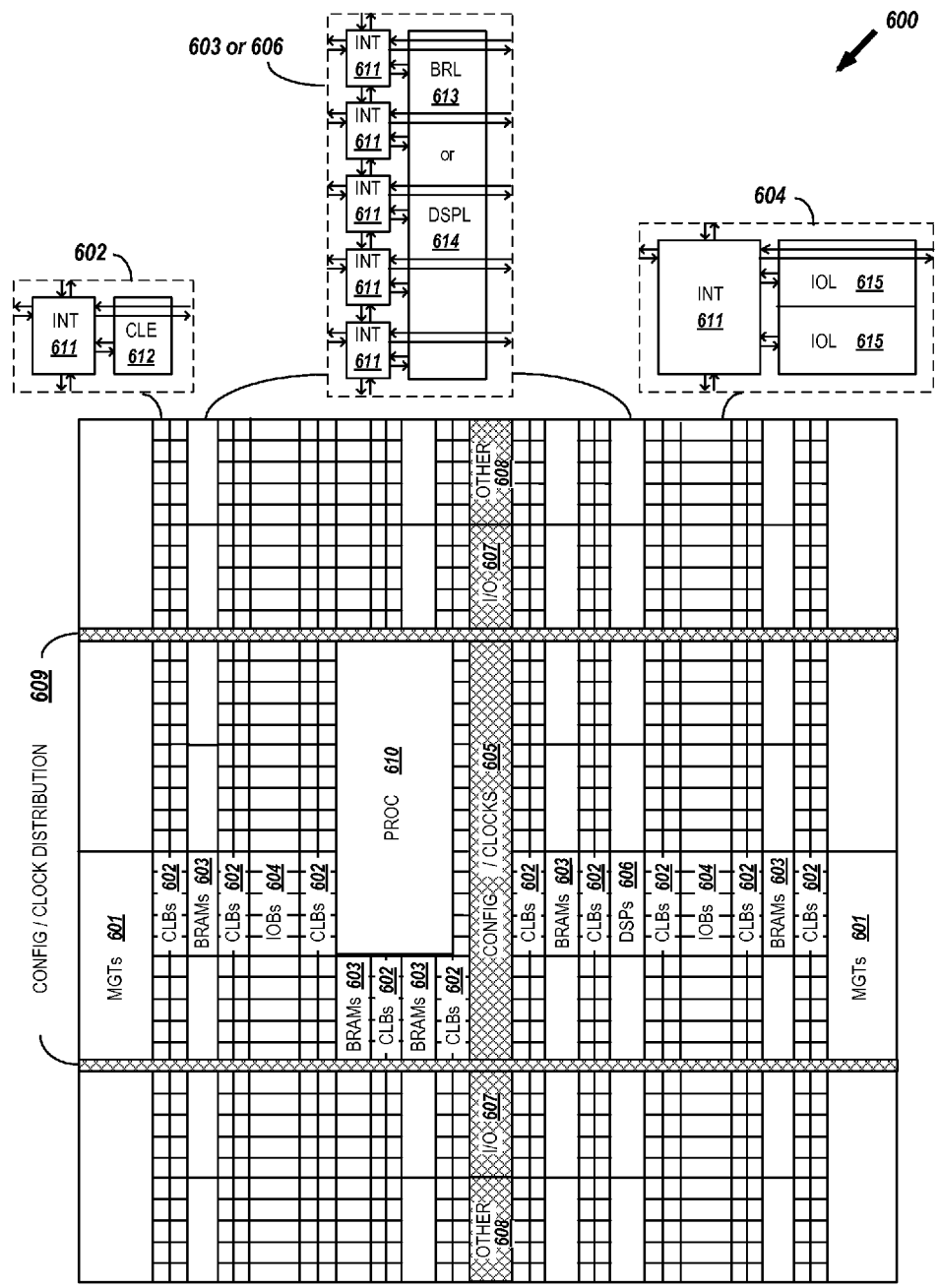
FIG. 6 illustrates a block diagram of a programmable integrated circuit for implementing cryptographic operations in accordance with various embodiments of the invention.

FIG. 6 is a block diagram of an example field programmable gate array (FPGA) which is configurable in accordance with various embodiments of the invention. FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, clock ports, and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

The present invention is thought to be applicable to a variety of systems for a data encryption and decryption. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A secure cryptographic device, comprising:
   a power port;
   a modulation circuit having a first and second inputs and an output, the first input coupled to and driven by the power port;
   a cryptographic processing block coupled to and driven by the output of the modulation circuit;
   a random number generator; and
   a complex multiplication circuit configured to provide a product of a multiplicand and a multiplier as output to the second input of the modulation circuit for modulating a power variation waveform detectable on the power port responsive to the output of the complex multiplication circuit, the complex multiplication circuit having a first input coupled to and configured to receive the multiplier from an output of the random number generator and a second input coupled to and configured to receive the multiplicand from the output of the modulation circuit.

2. The secure cryptographic device of claim 1, wherein the complex multiplication circuit multiplies real and imaginary components of the power variation waveform with a random output from the random number generator.

3. The secure cryptographic device of claim 1, further comprising:
   a digital-to-analog converter coupled to the output of the random number generator;
   a complex waveform generator coupled to an output of the digital-to-analog converter; and
   wherein the first input of the complex multiplication circuit is coupled to the output of the random number generator via the analog-to digital converter and complex waveform generator.

4. The secure cryptographic device of claim 3, wherein the complex waveform generator:
   multiplies the output of the digital-to-analog converter with a sine wave to generate an imaginary waveform component;
   multiplies the output of the digital-to-analog converter with a cosine wave to generate a real waveform component; and
   adds the imaginary and real waveform components.

5. The secure cryptographic device of claim 1, wherein the random number generator includes:
   a ring oscillator; and
   a linear feedback shift register circuit coupled to an output of the ring oscillator.

6. The secure cryptographic device of claim 5, wherein the ring oscillator is configured to oscillate at a first frequency and the linear feedback shift register is driven by a clock having a second frequency.

7. The secure cryptographic device of claim 1, further comprising an antenna coupled to the output of the complex multiplication circuit.

8. The secure cryptographic device of claim 1, wherein the modulation circuit includes a transistor having a source and a drain selectably coupling the power port to a ground voltage, the transistor having a gate coupled to the output of the complex multiplication circuit.

9. A programmable integrated circuit (IC), comprising:
   configuration memory;
   programmable logic resources coupled to the configuration memory;
   programmable interconnection resources coupled to the configuration memory and programmable logic resources;
   a configuration controller coupled to the configuration memory, the configuration controller configured to:
      decrypt input configuration data using values from a portion of the configuration memory as a decryption key; and
      program the configuration memory with the decrypted input configuration data; and
   a power port coupled to the configuration controller;
   a modulation circuit having a first and second inputs and an output, the first input coupled to and driven by the power port, and the second output driving the configuration controller;
   a pseudo-random complex waveform generator; and
   a complex multiplication circuit configured to provide a product of a multiplicand and a multiplier as output to the second input of the modulation circuit for modulating a power variation waveform detectable on the power port responsive to the output of the complex multiplication circuit, the complex multiplication circuit having a first input coupled to and configured to receive the multiplier from an output of the pseudo-random complex waveform generator, a second input coupled to and configured to receive the multiplicand from the output of the modulation circuit.

10. The programmable integrated circuit of claim 9, wherein the complex multiplication circuit multiplies real and imaginary components of the power variation waveform with an output from the pseudo-random complex waveform generator.

11. The programmable integrated circuit of claim 9, wherein the complex waveform generator includes:
   a pseudo-random number generator;
   a digital-to-analog converter coupled to the output of the pseudo-random number generator; and
   two multiplier circuits each coupled to an output of the digital-to-analog converter;
   wherein the two multiplier circuits respectively multiply the output of the digital-to-analog converter with a sine wave to generate an imaginary waveform component and multiply the output of the digital-to-analog converter with a cosine wave to generate a real waveform component.

12. The programmable integrated circuit of claim 9, further comprising an antenna coupled to the output of the complex multiplication circuit.

* * * * *